United States Patent Office 2,902,486
Patented Sept. 1, 1959

2,902,486

10-[2'-(N-ALKYL-PIPERIDYL-2'')-ETHYL-1']-PHENO-THIAZINES CONTAINING A SUBSTITUENT IN 3-POSITION

Arthur Stoll, Arlesheim, Baselland, and Jany Renz and Jean-Pierre Bourquin, Basel, Switzerland, assignors to Sandoz Ltd., Basel, Switzerland No Drawing. Application January 14, 1958
Serial No. 708,773

Claims priority, application Switzerland July 23, 1954

8 Claims. (Cl. 260—243)

The present invention is concerned with therapeutically useful phenothiazines which contain an N-alkyl-piperidyl-2-ethyl group at the phenothiazine nitrogen atom and also contain a substituent in the 3-position of the phenothiazine nucleus.

The phenothiazines according to the present invention thus correspond to the formula

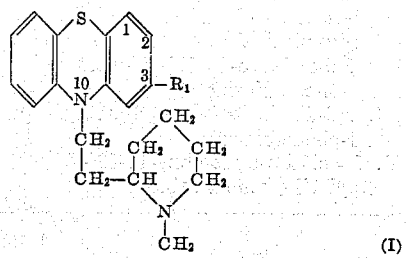

wherein $R_1$ may be a halogen atom or an alkoxy group (1 to 4 carbon atoms).

The compounds of Formula I may be prepared, according to this invention, by condensing a phenothiazine derivative which corresponds to the formula

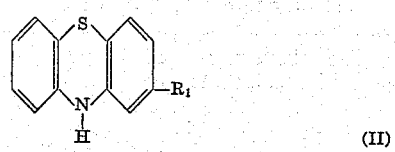

wherein $R_1$ has the previously-indicated significance, with a heterocyclic amine which is substituted in the α-position to the nitrogen atom with a β-halogenoethyl group, said amine corresponding to the formula

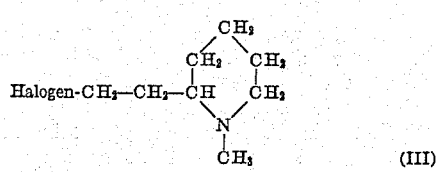

wherein "halogen" is a chlorine or bromine atom.

The condensation may, for example, be carried out as follows:

A phenothiazine derivative of Formula II is dissolved in an organic solvent, such for example as benzene, toluene, xylene, etc., and is then heated together with a β-halogenoethyl derivative of Formula III in the presence of an alkaline condensing agent such for example as an alkali metal or an alkali metal compound such as the hydroxide, amide, hydride or alkanolate. The reaction may also be carried out at ordinary temperature (e.g. at about 20–30° C.). It is also possible to carry out the reaction without employing a solvent, i.e. in the phenothiazine melt, in which case a condensing agent may also be omitted, although in some cases the yield may be somewhat reduced. Upon completion of the reaction, the reaction mixture is shaken out with water, and is then freed of solvent under reduced pressure. The new compounds may, however, also be extracted from the reaction mixture by means of dilute mineral or organic acid and then precipitated from the aqueous phase by the addition of caustic alkali or ammonia. The obtained new bases can be filtered off in those cases where they separate out in solid form, or where they separate out in oily state, can be taken up in benzene or another water-immiscible solvent and then again freed of solvent by evaporation. The bases can be purified by distillation in a high vacuum and/or by conversion into salt form.

The compounds of this application are primarily useful as specific sedatives, i.e. tranquillizers, and thus are useful in the treatment of states of excitement and anxiety due to various psychoses, states of illusion and delusion, and states of tension and unrest of any source, e.g. in connection with arteriosclerosis, neurosis in climacterium, in connection with vegetative disturbances, insomnia, various forms of vomiting, e.g. in pregnancy, and in the reduction of pain.

Useful and reliable pharmacological tests have to be based on their specific action in animals and their characteristic mechanism of action: According to present knowledge, this concerns (a) the central and peripheral adrenolytic activity, and (b) the sedative action per se which can reliably be tested by the potentiating activity of hypnotic drugs.

(ad a) The antagonism of the phenothiazine derivatives to epinephrine takes place at peripheral and central sites and especially also at the "formation reticulauris" in the midbrain, a substrate which is specifically influenced by 3-chloro-10-(dimethylamino-propyl-3')-phenothiazine and other effective phenothiazine derivatives. The adrenolytic potency of these compounds—which the art considers as an essential action of psychosedatives—has thus been used repeatedly to test tranquillizers of the phenothiazine type.

(ad b) Courvoisier et al. (1948) first found that 3-chloro - 10 - (dimethylamino - propyl - 3') - phenothiazine (Chloropromazine) potentiates the hypnotic effect of barbiturates. This property of these drugs is essential for their clinical tranquillizing effect, since all clinically effective phenothiazine derivatives potentiate hypnosis.

The compounds of the present application were screened for their adrenolytic potency and their potentiating effect on barbiturate hypnosis. The following methods were employed for this comparison:

(i) *Adrenolytic effect.*—The inhibitory effect of these substances on epinephrine-induced contractions of the isolated seminal vesicle of the guinea pig was analyzed. The inhibitory potency was in each instance compared with that of a standard drug, dihydroergotamine (DHE), which is a highly potent adrenergic blocking agent. Its potency was expressed as being of the strength 1; the potency of a drug 3 times as strong as DHE, for example, is therefore expressed by 3. (Literature on DHE and methods: Rothlin et al., Helv. Physiol. Acta 3, C 43, 1945.)

(ii) *Potentiation of narcosis.*—For the assay of barbiturate potentiation, the method described by M. Taeschler and A. Cerletti in J. Pharmacol. Exp. Therap. 120, 179 (1957) was employed. The test was performed on mice of a uniform strain. The substances to be tested were injected 10 minutes before the narcotic barbiturate. The barbiturate potentiating activity is expressed by the percentage of mice which show a narcosis for more than 2 minutes following injection of a non-narcotic dose of Pentothal (20 mgs. per kg. body weight intravenously). $ED_{50}$, for example, is the dose to which 50 percent of the total number of mice respond by a narcosis of more than 2 minutes.

TABLE I

*Comparison of the pharmacodynamic properties of compounds of the present invention and 10-[(N-methyl-piperidyl - 3') - methyl] - phenothiazine (Nieschulz, Arzneimittelf.4, 232 (1954))*

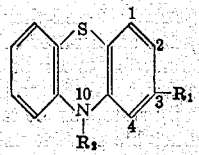

I: 3 - chloro - 10 - [2' - (N - methyl - piperidyl - 2'')-ethyl-1']-phenothiazine II: 3 - bromo - 10 - [2' - (N - methyl - piperidyl - 2'')-ethyl-1']-phenothiazine III: 3 - methoxy - 10 - [2' - (N - methyl - piperidyl - 2'')-ethyl-1']-phenothiazine IV: 3 - isopropoxy - 10 - [2' - (N - methyl - piperidyl-2'')-ethyl-1']-phenothiazine V: 10 - [(N - methyl - piperidyl - 3') - methyl] - phenothiazine

| Compounds | Adrenolytic potency, DHE=1 | Potentiation of hypnosis, ED$_{50}$, mg./kg., i.v. | Clinical activity as tranquillizers |
|---|---|---|---|
| I: R$_1$=Cl, R$_2$=a* | 0.48 | 3.6 | potent. |
| II: R$_1$=Br, R$_2$=a* | 0.62 | 2.5 | Do. |
| III: R$_1$=OCH$_3$, R$_2$=a* | 1.1 | 3.0 | Do. |
| IV: R$_1$=OCH(CH$_3$)$_2$, R$_2$=a* | 4.5 | 5.0 | Do. |
| V: R$_1$=H, R$_2$= —CH$_2$–(piperidyl-N-CH$_3$) | 0.01 | 18.0 | weak. |

*a = —CH$_2$—CH$_2$— 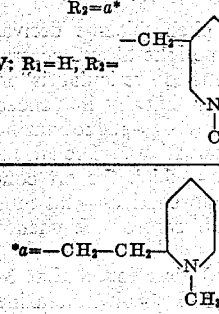

The data in Table I clearly shows the difference in activity between Compounds I to IV according to the present invention, on the one hand, and the known Compound V, on the other hand.

The adrenolytic activity of Compound I is almost 48 times greater and that of Compound II is about 62 times greater than that of Compound V. The results with the phenothiazine derivatives which are substituted in the 3-position by an alkoxy group are entirely surprising. Thus, Compound III has an adrenolytic activity which is almost 110 times greater than that of Compound V, while the adrenolytic activity of Compound IV is as much as 450 times greater than that of the latter compound. The pharmacological activities of these compounds is parallelled by their clinical activity, Compound V showing only a weak activity clinically, while the other compounds (I to IV) have very potent activities, even in clinical tests on the human organism.

Pharmacological tests have confirmed that only the 10 - [2' - (piperidyl) - 2'') - ethyl - 1'] - phenothiazines which are substituted in the 3-position by a halogen atom or an alkoxy group, in accordance with the present invention, possess these marked pharmacodynamic activities. The pharmacodynamic activities of the phenothiazines which are substituted at a position other than the 3-position of the phenothiazine nucleus—as for example 1-chloro - 10 - [2' - (N - methyl - piperidyl - 2'') - ethyl-1']-phenothiazine—or which are twice substituted in the phenothiazine nucleus—as for example 3,6-dichloro-10-[2' - (N - methyl - piperidyl - 2'') - ethyl - 1'] - phenothiazine, 3,8 - dichloro - 10 - [2' - (N - methyl - piperidyl - 2'') - ethyl - 1'] - phenothiazine or 3 - chloro - 6 - methoxy - 10 - [2' - (N - methyl - piperidyl - 2'') - ethyl-1']-phenothiazine—are significantly inferior.

In the following table the comparative action of 3-chloro - 10 - [2' - (N - methyl - piperidyl - 2'') - ethyl - 1'] phenothiazine with 1 - chloro - 10 - [2' - (N - methyl-piperidyl-2'')-ethyl-1']-phenothiazine and with the di-substituted derivatives of 10-[2'-(N-methyl-piperidyl-2'')-ethyl-1']-phenothiazine is demonstrated.

TABLE II

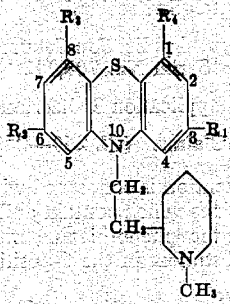

I: 3-chloro - 10 - [2'-(N-methyl-piperidyl-2'')-ethyl-1']-phenothiazine

II: 1-chloro - 10 - [2'-(N-methyl-piperidyl-2'')-ethyl-1']-phenothiazine

III: 3,6-dichloro-10-[2'-(N-methyl-piperidyl-2'') - ethyl-1']-phenothiazine

IV: 3,8-dichloro-10-[2'-(N-methyl-piperidyl-2'') - ethyl-1']-phenothiazine

V: 3 - chloro-6-methoxy-10-[2'-(N-methyl-piperidyl-2'')-ethyl-1']-phenothiazine

| Compound | Adrenolytic potency, DHE=1 | Potentiation of hypnosis, ED$_{50}$, mg./kg., i.v. |
|---|---|---|
| I: R$_1$=Cl, R$_2$=R$_3$=R$_4$=H | 0.48 | 3.6 |
| II: R$_4$=Cl, R$_1$=R$_2$=R$_3$=H | 0.01 | 18 |
| III: R$_1$=R$_2$=Cl, R$_3$=R$_4$=H | 0.15 | 8 |
| IV: R$_1$=R$_3$=Cl, R$_2$=R$_4$=H | 0.04 | 6 |
| V: R$_1$=Cl, R$_2$=OCH$_3$, R$_3$=R$_4$=H | 0.2 | 12 |

The above-mentioned results demonstrate that the derivative substituted in 1-position by chlorine and the dichloro-derivatives 3,6-dichloro- and 3,8-dichloro-10-[2'-(N-methyl-piperidyl-2'')-ethyl-1'] - phenothiazine or the 3-chloro-6-methoxy-10-[2'-(N-methyl-piperidyl-2'')-ethyl-1']-phenothiazine are definitely and significantly less active than the monosubstituted 3-chloro-derivatives, as all these preparations II, III, IV and V have low adrenolytic potency and potentiate hypnosis only in relatively high doses.

The difference in activity between the 3-chloro-10-[2'-(N-methyl-piperidyl-2'')-ethyl-1'] - phenothiazine of the present invention, on the one hand, and the 10-[2'-(N-methyl-piperidyl-2'')-ethyl-1']-compounds which are substituted in the 1-position by chlorine or are disubstituted in the 3,6- or 3,8-positions, on the other hand, is thus distinctly evident. The adrenolytic activity of Compound I is 2.4 times greater than that of Compound V, 3.2 times greater than that of Compound III, 12 times greater than that of Compound IV, and as much as 48 times greater than that of Compound II. There is a similar great difference in the narcosis potentiating action of the said compounds.

Where compounds have a narcosis potentiating action in doses up to 5 mg./kg., the compounds may properly be said to have a distinctly specific narcosis potentiation activity. However, the farther the effective narcosis potentiating dose exceeds the said limit, the closer does it come to an unspecific and sub-toxic range. This is of particular significance in therapy, since a dosage increase of even 1–2 mg./kg. involves, e.g. in a man weighing 70 kg., as much as 70 to 140 mg. It is clear from the foregoing considerations that Compounds III, IV and V, and especially Compound II, are so weak in their action as to render them practically useless in therapy.

Moreover, in compounds of the type here involved, the substitution by a halogen atom or by an alkoxy group in the 3-position results in much stronger activities than does substitution by an alkyl or an hydroxy group. Likewise the 3-unsubstituted compounds are only weakly active and of no practical utility since the therapeutic doses thereof lie in the toxic range.

In the following table, the comparative action of 3-halogeno- or 3-alkoxy-10-[2'-(N-methyl-piperidyl-2'')-ethyl-1']-phenothiazine with such phenothiazine derivatives is demonstrated.

TABLE III

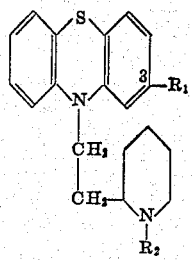

I: 3-chloro - 10 - [2'-(N-methyl-piperidyl-2'')-ethyl-1']-phenothiazine
II: 3-bromo - 10 - [2'-(N-methyl-piperidyl-2'')-ethyl-1']-phenothiazine
III: 3-iodo - 10 - [2'-(N-methyl-piperidyl-2'') - ethyl-1']-phenothiazine
IV: 3-methoxy - 10 - [2'-(N-methyl-piperidyl-2'')-ethyl-1']-phenothiazine
V: 3-isopropoxy - 10 - [2'-(N-methyl-piperidyl-2'')-ethyl-1']-phenothiazine
VI: 10 - [2'-(N-methyl-piperidyl-2'') - ethyl-1'] - phenothiazine
VII: 3-methyl - 10 - [2'-(N-methyl-piperidyl-2'') - ethyl-1']-phenothiazine
VIII: 3-hydroxy - 10 - [2'-(N-methyl-piperidyl-2'')-ethyl-1']-phenothiazine
IX: 3-bromo - 10 - [2'-(piperidyl-2'')-ethyl-1'] - phenothiazine

| Compound | Adrenolytic potency, DHE=1 | Potentiation of hypnosis, ED$_{50}$, mg./kg., i.v. |
|---|---|---|
| I: R$_1$=Cl; R$_2$=CH$_3$ | 0.48 | 3.6 |
| II: R$_1$=Br; R$_2$=CH$_3$ | 0.62 | 2.5 |
| III: R$_1$=I; R$_2$=CH$_3$ | ---------- | 3.7 |
| IV: R$_1$=OCH$_3$; R$_2$=CH$_3$ | 1.1 | 3.0 |
| V: R$_1$=OCH(CH$_3$)$_2$; R$_2$=CH$_3$ | 4.5 | 5.0 |
| VI: R$_1$=H; R$_2$=CH$_3$ | 0.12 | 7.5 |
| VII: R$_1$=CH$_3$; R$_2$=CH$_3$ | 0.16 | 6.0 |
| VIII: R$_1$=OH; R$_2$=CH$_3$ | <0.05 | >30 |
| IX: R$_1$=Br; R$_2$=H | 0.48 | >20 |

It is clear from the foregoing that the adrenolytic activity of Compound I is four times greater than that of Compound VI and three times greater than that of Compound VII. The 3-methoxy-10-[2'-(N-methyl-piperidyl-2'')-ethyl-1']-phenothiazine (IV) shows an almost seven times greater activity than Compound VII, and a nine times greater activity than the compound (VI) which is unsubstituted in the 3-position. The isopropoxy-phenothiazine derivative (V) is as much as 28 times stronger than the 3-methyl-phenothiazine-derivative (VII) and 37.5 times stronger than the unsubstituted compound (VI). The narcosis potentiating action of Compounds II, III, IV and V is very good, those of Compounds VI and VII are weak. Compounds VIII and IX lie in the toxic range. Although Compound IX exhibits adrenolytic activity, it is of no practical utility since it lacks the sedative component at non-toxic doses.

The point of connection to the piperidine ring is also of significance with respect to pharmacodynamic activity. Thus, the compounds according to the present invention, which have a [2'-(N-methyl-piperidyl-2'')-ethyl-1']-group in the 10-position, are significantly more active than phenothiazines which carry a (N-methyl-piperidyl-3)-methyl-group in the 10-position of the phenothiazine nucleus. This is shown by the following table.

TABLE IV

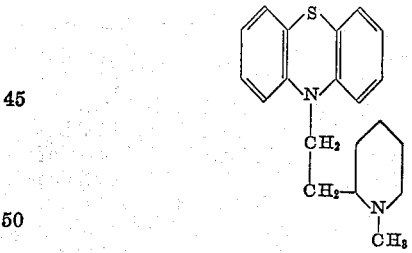

I: R$_1$=Cl
II: R$_1$=OCH$_3$

III: R$_1$=Cl
IV: R$_1$=OCH$_3$

| Compound | Adrenolytic potency, DHE=1 | Potentiation of hypnosis, ED$_{50}$, mg./kg., i.v. |
|---|---|---|
| I: R$_1$=Cl | 0.48 | 3.6 |
| II: R$_1$=OCH$_3$ | 1.1 | 3.0 |
| III: R$_1$=Cl | 0.06 | 20 |
| IV: R$_1$=OCH$_3$ | 0.08 | 11.5 |

It is evident from the foregoing that the adrenolytic activity of the Compounds III and IV is only 7 to 12.5%. Since, in connection with the potentiation of hypnosis activity of these compounds (III and IV) the dose exceeds 10 mg./kg., they must be considered as relatively non-specific.

Comparison, finally, between tertiary and quaternary phenothiazine derivatives shows that quaternization of for example 10 - [2' - (N - methyl - piperidyl - 2') - ethyl-1']-phenothiazines reduces adrenolytic activity to an extraordinarily great extent, and that the products no longer have a narcosis potentiating action in non-toxic doses. The quaternization of the compound of the formula

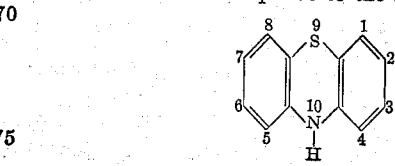

with methyl bromide brings about a very great drop in adrenolytic activity, in that the quaternary compound is 1000 times less active than the tertiary compound. In testing this quaternary compound on the waking mouse, a striking potentiation of toxicity can be observed. Intravenous doses of 3 mg./kg. have a lethal effect. However, administration of smaller doses does not enhance pentothal-narcosis but, on the contrary, has an exciting action.

The following examples set forth presently preferred representative embodiments of the invention. In these examples, parts (unless otherwise indicated) and percentages are by weight; temperature are in degrees centigrade. The relationship between parts by weight and parts by volume is as that between grams and milliliters. In these examples, as well as in the precednig text, the designation of the substituent positions in the phenothiazine nucleus corresponds to the following:

EXAMPLE 1

232.5 parts of 3-chloro-phenothiazine [P. Charpentier, P. Gailliot, R. Jacob, J. Gaudschon and P. Buisson, Comptes rendus 59, (1952)] (melting point=199-201°) are dissolved in the four-fold quantity of absolute xylene, after which 46.8 parts of sodamide (20% excess) are added, and the mixture is heated to boiling under reflux for 2½ hours, while stirring. Without interrupting the heating, a solution of 177.6 parts of 2-(N-methyl-piperidyl-2')-1-chloro-ethane (10% excess) in an equal quantity of absolute xylene, is added dropwise in the course of two hours. After boiling for 10 hours, the reaction mixture is cooled, and excess sodamide is decomposed by the addition of 15 parts of ammonium chloride. The reaction solution is shaken out several times with, in toto, the equal volume of water, after which the solution is evaporated under reduced pressure at 70°. The resultant residue is digested cold with the three-fold quantity of petroleum ether (boiling point=40-60°), the petroleum ether is decanted from unconsumed 3-chloro-phenothiazine, and the solvent distilled off on the steam bath at atmospheric pressure.

The so-obtained residue is distilled under high vacuum, the fraction passing over between 200 and 220° (under a pressure of 0.05 mm. Hg) being collected. Purification yields 3-chloro-10-[2'-(N-methyl-piperidyl-2'')-ethyl-1']-phenothiazine which boils at 206-211°/0.05 mm. Hg.

EXAMPLE 2

In order to prepare the hydrochloride of 3-chloro-10-[2'-(N-methyl-piperidyl-2'')-ethyl-1']-phenothiazine, the free base—obtained according to the foregoing example—is dissolved in the ten-fold quantity of absolute ethanol, and ethanolic hydrochloric acid (of 25% strength) is added until the solution has an acid reaction to Congo red; the hydrochloride of 3-chloro-10-[2'-(N-methyl-piperidyl-2'')-ethyl-1']-phenothiazine gradually separating out in crystalline form. The analytically-pure hydrochloride melts at 213-215°.

EXAMPLE 3

278.17 parts of 3-bromo-phenothiazine (melting point=199-201°) are dissolved in the four-fold quantity of absolute xylene, after which 46.8 parts of sodamide (20% excess) are added, and the mixture is heated to boiling under reflux for 2½ hours, while stirring. Without interrupting the heating, a solution of 177.6 parts of 2-(N-methyl-piperidyl-2')-1-chloro-ethane (10% excess) in an equal quantity of absolute xylene, is added dropwise in the course of 2 hours. After boiling for 10 hours, the reaction mixture is cooled, and excess sodamide is decomposed by the addition of 15 parts of ammonium chloride. The reaction solution is shaken out several times with, in toto, the equal volume of water, after which the solution is evaporated under reduced pressure at 70°. The resultant residue is digested cold with the three-fold quantity of petroleum ether (boiling point=40-60°), the petroleum ether is decanted from unconsumed 3-bromo-phenothiazine, and the solvent distilled off on the steam bath at atmospheric pressure.

The so-obtained residue is distilled under high vacuum, the fraction passing over between 210 and 230 (under a pressure of 0.05 mm. Hg) being collected. Purification yields 3-bromo-10-[2'-(N-methyl-piperidyl-2'')-ethyl-1']-phenothiazine which boils at 216-218°/0.07 mm. Hg.

EXAMPLE 4

In order to prepare the hydrochloride of 3-bromo-10-[2'-(N-methyl-piperidyl-2'')-ethyl-1']-phenothiazine, the free base—obtained according to the foregoing example—is dissolved in the ten-fold quantity of absolute ethanol, and ethanolic hydrochloric acid (of 25% strength) is added until the solution has an acid reaction to Congo red, the hydrochloride of 3-bromo-10-[2'-(N-methyl-piperidyl-2'')-ethyl-1']-phenothiazine gradually separating out in crystalline form. The analytically-pure hydrochloride melts at 218-220°.

EXAMPLE 5

15.0 parts of 3-iodo-phenothiazine, 4.8 parts of pulverized sodium hydroxide and 60 parts by volume of absolute xylene are heated to boiling for two hours, while stirring, at a bath temperature of 180°. Without interrupting the heating, a solution of 8.8 parts of 2-(N-methyl-piperidyl-2'')-1-chloro-ethane (boiling point=84°/10 mm. Hg) [T. R. Norton and coworkers, J. Am. Soc. 68, 1573 (1946)] in 10 parts by volume of absolute xylene is added dropwise in the course of 1½ hours. After heating for three more hours under reflux, the reaction mixture is cooled and 100 parts by volume of absolute xylene added. The mixture is then shaken out, first three times with 35 parts by volume of water each time, and then once with 120 parts by volume of aqueous tartaric acid of 15% strength. The tartaric acid solution is shaken out twice with, each time, 30 parts by volume of benzene. The aqueous solution is then adjusted to alkalinity to phenolphthalein with 80 parts by volume of aqueous caustic soda solution of 30% strength. The base which precipitates is shaken out once with 50 parts by volume and twice with, each time, 25 parts by volume of benzene, and the benzene solution then washed twice with, each time, 30 parts by volume of water. After drying over a small quantity of potassium carbonate and distilling off the benzene, 21.0 parts of crude oily base remain behind. Upon distilling the latter, there is obtained 3-iodo-10-[2'-(N-methyl-piperidyl-2'')-ethyl-1']-phenothiazine which has a boiling point of 240-250° under a pressure of 0.03 mm. Hg.

EXAMPLE 6

To prepare the hydrochloride of 3-iodo-10-[2'-(N-methyl-piperidyl-2'')-methyl-1']-phenothiazine, the oily base is dissolved in 30 parts by volume of isopropanol, after which isopropanol which is saturated with sodium chloride is added until an acid reaction is achieved. The hydrochloride which crystallizes out is cooled to 0°, filtered off with suction, and then washed on the suction filter with 20 parts by volume of isopropanol. After two recrystallizations of the moist product from 35 parts by volume of ethanol, there is obtained the analytically-pure hydrochloride of 3-iodo-10-[2'-(N-methyl-piperidyl-2'')-ethyl-1']-phenothiazine with a constant melting point of 205-207°.

EXAMPLE 7

17.15 parts of 3-methoxy-phenothiazine (melting point, after purification by sublimation=190-192°), 4.48 parts of finely pulverized sodium hydroxide and 80 parts by volume of absolute xylene are heated to boiling, at a bath temperature of 180°, under a reflux condenser having a water separator, for 3 hours while stirring. Without interrupting the heating, a solution of 14.5 parts of 2-(N-methyl-piperidyl-2')-1-chloro-ethane (boiling point=84°/10 mm.) in 15 parts by volume of absolute xylene is added dropwise in the course of 2 hours. After heating for 3 more hours, the reaction mixture is cooled and shaken out three times, each time with 40 parts by volume of water. The xylene solution is then extracted 4 times, each time with 50 parts by volume of dilute acetic acid, the acetic acid extract is washed once with ether and then rendered alkaline to phenolphthalein with 50 parts by volume of concentrated aqueous caustic soda solution. The precipitated oily base is taken up in a total of 100 parts by volume of benzene. The benzene layer, washed with 60 parts by volume of water, is dried over potassium carbonate and, after filtration, is evaporated under reduced pressure. The residue from the evaporation is distilled in a high vacuum. After separating a fore-runing fraction distilling up to 208° at 0.01 mm. Hg, the main fraction—3-methoxy-10-[2'-(N-methyl-piperidyl-2'')-ethyl-1']-phenothiazine—distilling at 208-213° under the same pressure is collected. The desired 3- methoxy-10-[2'-(N-methyl-piperidyl-2'')-ethyl-1']-phenothiazine has a boiling point of 211° at 0.01 mm. Hg.

EXAMPLE 8

The hydrochloride of the 3-methoxy-10-[2'-(N-methyl-piperidyl-2'')-ethyl-1']-phenothiazine is obtained by rendering the solution of 21.3 parts of the free base in 15 parts by volume of absolute ethanol acid to Congo red by means of ethanolic hydrochloric acid. After the addition of 150 parts by volume of ethyl acetate, the hydrochloride of 3-methoxy-10-[2'-(N-methyl-piperidyl-2'')-ethyl-1']-phenothiazine crystallizes out in the cold. It melts at 171–173° (sintering beginning at 165°) with evolution of gas.

EXAMPLE 9

Upon the addition to a solution of 12.0 parts of 3-methoxy-10-[2'-(N-methyl-piperidyl-2'')-ethyl-1']-phenothiazine in 110 parts by volume of ethyl acetate, of a solution of 5.05 parts of tartaric acid in 850 parts by volume of ethyl acetate, the 3-methoxy-10-[2'-(N-methyl-piperidyl-2'')-ethyl-1']-phenothiazine tartrate crystallizes out. The analytically-pure salt contains one mol of water of crystallization. It decomposes at 115° with foaming, after sintering at about 60°.

EXAMPLE 10

3-ethoxy-phenothiazine (melting point=131–132°) is prepared by heating N-(m-ethoxy-phenyl)-aniline and sulfur at 160° in the presence of iodine crystals as catalyst.

26.63 parts of 3-ethoxy-phenothiazine, 11.0 parts of finely pulverized sodium hydroxide and 125 parts by volume of absolute xylene are heated to boiling for three hours, at a bath temperature of 185°, under a reflux condenser fitted with a water separator. Without interrupting the heating, a solution of 19.9 parts of 2-(N-methyl-piperidyl-2')-1-chloroethane in 45 parts by volume of absolute xylene is added dropwise in the course of two hours. After heating for five more hours, the reaction mixture is cooled and washed three times with water, each time with 75 parts by volume. The xylene solution is extracted once with 50 parts by volume and three times with 25 parts by volume each of 3-normal acetic acid. The acetic acid extract is washed twice with benzene, each time with 30 parts by volume, and is then rendered phenolphthalein-alkaline with 30 parts by volume of concentrated aqueous caustic soda solution. The precipitated oily base is taken up in a total of 175 parts by volume of benzene. The benzene solution, washed with 60 parts by volume of water, is dried over potassium carbonate and, after filtration, is evaporated under reduced pressure; after separating a fore-running fraction distilling up to 212° at 0.01 mm. Hg, the principal fraction—3-ethoxy-10-[2'-(N-methyl-piperidyl-2'')-ethyl-1']-phenothiazine—distilling at 212–215° under the said pressure is collected. The analytically-pure base has a boiling point of 213°/0.01 mm. Hg.

EXAMPLE 11

Upon addition of a solution of 18.4 parts of 3-ethoxy-10-[2'-(N-methyl-piperidyl-2'')-ethyl-1']-phenothiazine in 175 parts by volume of ethyl acetate to a solution, cooled to 0°, of 7.51 parts of tartaric acid in 1725 parts by volume of ethyl acetate, the tartrate of 3-ethoxy-10-[2'-(N-methyl-piperidyl-2'')-ethyl-1']-phenothiazine separates out. The salt, which contains ½ mol of water of crystallization, decomposes above 140°, with sintering beginning at 70°.

EXAMPLE 12 m-Nitro-isopropoxy-benzene (boiling point=132–133°/10 mm. Hg) is reduced with stannous chloride and hydrochloric acid to m-isopropoxy-aniline (boiling point =126–129°/10 mm. Hg), which is condensed with potassium o-chlorobenzoate to N-(m-isopropoxy-phenyl)-anthranilic acid (melting point=88–90°). The latter is decarboxylated by heating and distillation under reduced pressure, to yield N-(m-isopropoxy-phenyl)-aniline (boiling point=194°/10 mm. Hg).

3-isopropoxy-phenothiazine (melting point=105–107°) is prepared by heating N-(m-isopropoxy-phenyl)-aniline with sulfur to 160° in the presence of iodine crystals as catalyst. 20.70 parts of 3-isopropoxy-phenothiazine, 3.76 parts of finely pulverized sodamide and 90 parts by volume of absolute xylene are heated to boiling for two hours with stirring, at a bath temperature of 180°, under a reflux condenser. Without interrupting the heating, a solution of 14.65 parts of 2-(N-methyl-piperidyl-2')-1-chloro-ethane in 15 parts by volume of absolute xylene is added dropwise in the course of two hours. After heating for three more hours, the reaction mixture is cooled and, after the addition of 5 parts of ammonium chloride, is shaken out three times with water, using 25 parts by volume each time. The xylene solution is washed once with 35 parts by volume of 3-normal acetic acid and then three times—each time with 15 parts by volume of 3-normal acetic acid, then the acetic acid extract is washed with 60 parts by volume of benzene and made phenolphthalein-alkaline with 25 parts by volume of concentrated aqueous caustic soda solution. The precipitated oily base is taken up in a total of 100 parts by volume of benzene. The benzene layer, dried over potassium carbonate, is filtered and then evaporated under reduced pressure. The residue from the evaporation is distilled in a high vacuum; after separating a fore-running fraction distilling up to 200° under a pressure of 0.005 mm. Hg, the principal fraction—3-isopropoxy-10-[2'-(N-methyl-piperidyl-2'')-ethyl-1']-phenothiazine—which distills at 200–204° under the said pressure is collected. The analytically-pure base boils at 202°/0.005 mm. Hg.

EXAMPLE 13

Upon adding a solution of 10.9 parts of 3-isopropoxy-10-[2'-(N-methyl-piperidyl-2'')-ethyl-1']-phenothiazine in 100 parts by volume of ethyl acetate to a solution, cooled to 0° C., of 4.27 parts of tartaric acid in 750 parts by volume of ethyl acetate, the tartrate of 3-isopropoxy-10-[2'-(N-methyl-piperidyl-2'')-ethyl-1']-phenothiazine is precipitated. The salt, which contains ½ mol of water of crystallization, decomposes at 145° with formation of foam after sintering beginning at 80°.

EXAMPLE 14

In order to prepare the malate of 3-isopropoxy-10-[2'-(N-methyl-piperidyl-2'')-ethyl-1']-phenothiazine, 10.00 parts of the base—obtained as described in Example 12— and 3.51 parts of maleic acid are dissolved in 25 parts by volume of boiling absolute ethanol. To the cooled solution 40 parts by volume of ether are added, the malate precipitating out. The malate of 3-isopropoxy-10[2'-(N-methyl-piperidyl-2'')-ethyl-1']-phenothiazine crystallizes from absolute ethanol-ether and melts at 105–107°.

EXAMPLE 15

N-(m-sec.-butoxy-phenyl)-aniline (boiling point=155°/0.005 mm. Hg) is prepared by the action of 2-chloro-n-butane on the potassium salt of N-phenyl-m-aminophenol (melting point=81.5–82°). By heating the N-(m-sec-butoxy-phenyl)-aniline with sulfur to 160° in the presence of pulverized iodine as catalyst, 3-sec.-butoxy-phenothiazine (melting point=75–77°) is obtained. 24.19 parts of 3-sec.-butoxy-phenothiazine, 4.25 parts of finely pulverized sodamide and 125 parts by volume of absolute xylene are heated to boiling for two hours under a reflux condenser, with stirring and at a bath temperature of 180°. Without interrupting the heating, a solution of 16.15 parts of 2-(N-methyl-piperidyl-2')-1-chloro-ethane in 15 parts by volume of absolute xylene is added dropwise in the course of two hours. After heating for three more hours, the reaction mixture is cooled and, after the addition of 10 parts of ammonium chloride, is shaken out three times with water, using 50 parts by volume each time. The xylene solution is extracted once with 50 parts by volume of 3-normal acetic acid and then three times with 3-normal acetic acid, using 25 parts by volume each time. The acetic acid extract is then washed with 100 parts by volume of ether and rendered phenolphthalein-alkaline by means of 35 parts by volume of concentrated aqueous caustic soda solution. The precipitated base is taken up in a total of 200 parts by volume of benzene. The benzene layer, after being dried over potassium carbonate, is filtered and evaporated under reduced pressure; after separating a fore-running fraction passing over up to 209° under a pressure of 0.005 mm. Hg, the principal fraction—3-sec.-butoxy-10-[2'-(N-methyl-piperidyl-2'')-ethyl-1']-phenothiazine—which passes over at 209–211° under the said pressure is collected. By recrystallization from the five-fold quantity of petroleum ether, there is obtained the analytically pure base (melting point=88–90°).

EXAMPLE 16

Upon the addition of a solution of 15.9 parts of 3-sec.-butoxy-10[2'-(N-methyl-piperidyl-2'')-ethyl-1']-phenothiazine in 125 parts by volume of ethyl acetate to a solution, cooled to 0°, of 6.0 parts of tartaric acid in 1000 parts by volume of ethyl acetate, the tartrate of the 3-sec.-butoxy-10-[2'-(N-methyl-piperidyl-2'')-ethyl-1']-phenothiazine is precipitated. The salt, containing ½ mol of water of crystallization, decomposes at 105° with foaming, after sintering beginning at 70°.

It will be understood that, in the foregoing examples, reference is made more particularly to the tartrates, hydrochlorides and malates, because these are the preferred salts of the phenothiazine bases of the invention. However, these bases readily yield therapeutically-tolerable acid addition salts with a wide variety of both organic and inorganic acids. Thus, by treating the bases with an equivalent amount of an appropriate acid, as, for example, hydrobromic, sulfuric, phosphoric, acetic, propionic, citric, methanesulfonic acid, etc., the corresponding hydrobromide, sulfate, phosphate, acetate, propionate, citrate, methane-sulfonate, etc., will be formed.

The 10-[2'-(N-alkyl-piperidyl-2'') - ethyl - 1'] - phenothiazines and salts thereof obtained according to the foregoing examples can be made up into pharmaceutical preparations for oral or parenteral administration in various dosages unit forms. For example, sugar-coated tablets of the following composition can be made.

|  | Mg. |
|---|---|
| (1) 3-isopropoxy-10-[2'-(N - methyl - piperidyl-2'')-ethyl-1']-phenothiazine | 25.00 |
| (2) Gelatine | 1.50 |
| (3) Stearic acid | 2.50 |
| (4) Tartaric acid | 5.00 |
| (5) Talcum | 10.00 |
| (6) Corn starch | 15.00 |
| (7) Milk sugar | 81.00 |
| Nucleus, diameter 7mm., strongly arched | 140.00 |
| Coating mass [1] | 120.00 |
| Sugar-coated tablet | 260.00 |

| [1] See the following tabulation: | Mg. |
|---|---|
| White sucrose | 85.00 |
| Talcum | 33.5 |
| Gum arabic | 1.5 |

| Dyestuffs: | Mg. |
|---|---|
| Tartrazine (Color Index No. 64) [1] | 0.012 |
| Cochineal Red A (Color Index No. 185) | 0.068 |

[1](Color Index, The Am. Assoc. of Textile Chemists and Colorists, New York, 1924).

*Preparation.*—The 3 - isopropoxy - 10-[2'-(N-methyl-piperidyl-2'')-ethyl-1']-phenothiazine and approximately 50 percent of the milk sugar are mixed, and 40 percent of the stearic acid, dissolved in q.s. ethanol of 94.0 percent strength, is worked together with this mixture. The whole is granulated with approximately 50 percent of the gelatine in distilled water q.s. and makes up granulate I.

The tartaric acid and the remaining 50 percent of milk sugar are mixed; 20 percent of the stearic acid is dissolved in q.s. ethanol of 94.0 percent strength and worked together with this mixture. The whole is granulated with the remaining 50 percent gelatine and makes up granulate II.

Granulates I and II are dried and mixed together with the talcum, the corn starch and the remaining 40 percent stearic acid. The mixture is pressed into tablets which are coated according to usual methods.

Ampoules for parenteral administration may be prepared in the following manner:

| Ampoule | mL | 1.0 |
|---|---|---|
| (1) 3 - isopropoxy-10-[2'-(N-methyl-piperidyl-2'')-ethyl-1']-phenothiazine | g | 0.00384 |
| (2) Maleic acid | g | 0.00116 |
| (3) Sodium chloride | g | 0.005 |
| (4) Carbon dioxide, q.s. | | |
| (5) Distilled water to 1.005 g. | | |

| Standards: | |
|---|---|
| pH (20° C.) | 4.1±0.5. |
| Specific gravity (20° C.) | 1.005±0.005. |
| Aspect | Clear, or at most a little yellowish. |

*Preparation.*—The 3-isopropoxy - 10 - [2'-(N-methyl-piperidyl-2'')-ethyl-1']-phenothiazine and the maleic acid are dissolved while warming in 75 percent of the distilled water=solution I.

The sodium chloride is dissolved in 25 percent of the distilled water=solution II.

Solutions I and II are united and the whole solution is made up with distilled water at 20° while stirring to the declared volume and saturated with carbon dioxide. The solution is filtered clear in a carbon dioxide atmosphere and filled in 5 ml.-ampoules. The ampoules are sterilized under excessive pressure at 120° C.

In the foregoing preparations, the 3-isopropoxy-10-[2'-(N-methyl-piperidly-2'')-ethyl-1']-phenothiazine may be replaced by any other one of the compounds of the present invention.

The present application is in part a continuation of application Serial No. 523,356, filed July 20, 1955, and application Serial No. 625,629, filed December 3, 1956, both of which are now abandoned.

Having thus disclosed the invention, what is claimed is:

1. A compound selected from the group consisting of the phenothiazines which correspond to the formula

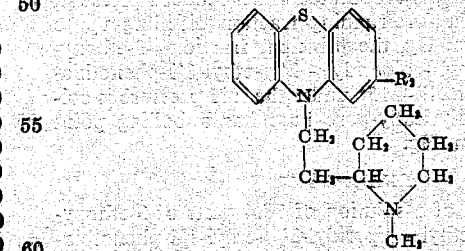

and the therapeutically-tolerable salts thereof with acids, wherein $R_1$ is a member selected from the group consisting of halogen and alkoxy with 1 to 4 carbon atoms.

2. A phenothiazine which corresponds to the formula

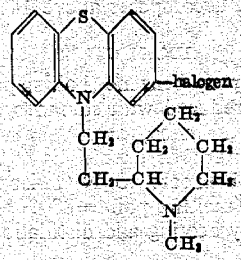

3. A phenothiazine which corresponds to the formula

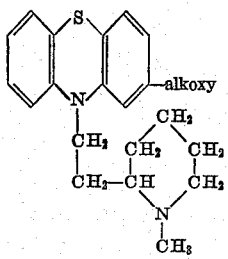

wherein the alkoxy group contains 1 to 4 carbon atoms.

4. 3 - isopropoxy - 10 - [2' - (N-methyl-piperidyl-2'')-ethyl-1']-phenothiazine.

5. 3 - methoxy - 10 - [2' - (N - methyl-piperidyl-2'')-ethyl-1']-phenothiazine.

6. 3 - chloro - 10 - [2'-(N-methyl-piperidyl-2'')-ethyl-1']-phenothiazine.

7. 3 - bromo - 10-[2'-(N-methyl-piperidyl-2'')-ethyl-1']-phenothiazine.

8. 3 - iodo - 10 - [2'-(N-methyl-piperidyl-2'')-ethyl-1']-phenothiazine.

References Cited in the file of this patent

UNITED STATES PATENTS

| | | |
|---|---|---|
| 2,590,125 | Robinson | Mar. 15, 1952 |
| 2,784,185 | Schuler | Mar. 5, 1957 |

OTHER REFERENCES

Nieschulz et al.: Arzneimittel Forschung, vol. 4, pp. 232–242 (April 1954).

UNITED STATES PATENT OFFICE

CERTIFICATE OF CORRECTION

Patent No. 2,902,486                                                   September 1, 1959

Arthur Stoll et al.

It is hereby certified that error appears in the printed specification of the above numbered patent requiring correction and that the said Letters Patent should read as corrected below.

Column 1, lines 30 to 32, the lower right-hand portion of the formula should appear as shown below instead of as in the patent -

column 6, line 67, for "precednig" read -- preceding --; column 7, line 62, for "230" read -- 230° --; column 12, lines 58 to 60, the lower right-hand portion of the formula should appear as shown below instead of as in the patent -

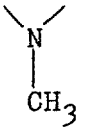

Signed and sealed this 24th day of May 1960.

(SEAL)
Attest:
KARL H. AXLINE                                                     ROBERT C. WATSON
Attesting Officer                                        Commissioner of Patents